United States Patent
Chen et al.

(10) Patent No.: US 10,871,969 B1
(45) Date of Patent: Dec. 22, 2020

(54) METHOD FOR SWITCHING BASIC INPUT/OUTPUT SYSTEM (BIOS) INTERFACE

(71) Applicants: INVENTEC (PUDONG) TECHNOLOGY CORPORATION, Shanghai (CN); INVENTEC CORPORATION, Taipei (TW)

(72) Inventors: Jin Chen, Shanghai (CN); Lai Kong, Shanghai (CN); Zhong-Ying Qu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/565,322

(22) Filed: Sep. 9, 2019

(30) Foreign Application Priority Data

Aug. 28, 2019 (CN) .......................... 2019 1 0801016

(51) Int. Cl.
*G06F 9/4401* (2018.01)
*G06F 3/023* (2006.01)
*G06F 9/451* (2018.01)
*G06F 9/48* (2006.01)

(52) U.S. Cl.
CPC ............ *G06F 9/4401* (2013.01); *G06F 3/023* (2013.01); *G06F 9/451* (2018.02); *G06F 9/4831* (2013.01)

(58) Field of Classification Search
CPC .................................................. G06F 9/4401
USPC ........................................................ 715/828
See application file for complete search history.

(56) References Cited

U.S. PATENT DOCUMENTS

| 7,620,758 | B2 * | 11/2009 | Hsu | H04N 21/4432 326/37 |
| 8,458,687 | B1 * | 6/2013 | Kang | G06F 9/5027 717/168 |
| 9,600,370 | B2 * | 3/2017 | Chiu | G06F 11/0793 |
| 9,710,334 | B2 * | 7/2017 | Chiu | G06F 11/2284 |
| 2003/0058215 | A1 * | 3/2003 | Yamaji | G06F 3/0489 345/156 |
| 2004/0093446 | A1 * | 5/2004 | Lin | G06F 9/451 710/67 |
| 2007/0055802 | A1 * | 3/2007 | Hsu | H04N 21/4432 710/67 |
| 2007/0198929 | A1 * | 8/2007 | Dieberger | G06F 9/451 715/713 |
| 2010/0271388 | A1 * | 10/2010 | Gillespie | G06F 9/451 345/592 |
| 2013/0268744 | A1 * | 10/2013 | Chan | G06F 9/4411 713/2 |

(Continued)

*Primary Examiner* — William D Titcomb
(74) *Attorney, Agent, or Firm* — Maschoff Brennan

(57) ABSTRACT

A method for switching basic input/output system (BIOS) interface, adapted to a basic input/output system (BIOS) having a complex module and a simplified module and executed by an electronic device, comprising entering a BIOS and displaying the simplified module on the BIOS interface, determining by the electronic device whether a hotkey is triggered, determining by the electronic device whether the hotkey is a first hotkey corresponding to the complex module when the hotkey is triggered, and hiding the simplified module and displaying the complex module on the BIOS interface when the hotkey is the first hotkey.

9 Claims, 3 Drawing Sheets

(56) References Cited

U.S. PATENT DOCUMENTS

| | | | | |
|---|---|---|---|---|
| 2014/0118263 | A1* | 5/2014 | Tajima | G06F 3/04895 345/168 |
| 2017/0177378 | A1* | 6/2017 | Chen | G06F 9/4401 |
| 2017/0185416 | A1* | 6/2017 | Chang | G06F 9/4406 |
| 2018/0293187 | A1* | 10/2018 | Radhakrishnan | G06F 9/4401 |
| 2019/0042272 | A1* | 2/2019 | Kotary | G06F 3/061 |
| 2019/0243637 | A1* | 8/2019 | Nachimuthu | G06F 3/0673 |
| 2019/0391799 | A1* | 12/2019 | Samuel | G06F 13/1668 |
| 2020/0026531 | A1* | 1/2020 | Lambert | G06F 9/4411 |

\* cited by examiner

METHOD FOR SWITCHING BASIC INPUT/OUTPUT SYSTEM (BIOS) INTERFACE

CROSS-REFERENCE TO RELATED APPLICATIONS

This non-provisional application claims priority under 35 U.S.C. § 119(a) on Patent Application No(s). 201910801016.5 filed in China on Aug. 28, 2019, the entire contents of which are hereby incorporated by reference.

BACKGROUND

1. Technical Field

This disclosure relates to a method for switching basic input/output system (BIOS) interface, more particularly to a method of switching BIOS interface aiming to still be able to switch the number of items displayed after entering the BIOS interface.

2. Related Art

Basic input/output system (BIOS) tests and performs initialization on computer hardware during the power-on and startup phase of the computer system. Wherein, in the early stage of system development, BIOS interface displays all the setup options in order to run tests and debug. And in the late stage of system development, BIOS interface will simplify the options set.

Although the setup options displayed on the BIOS interface will be adjusted according to the early/late stage of system development, BIOS interface still displays many set options even in the early stage of system development, resulting in the time required for writing specification being too long. On the other hand, even the BIOS interface in the late stage of system development will be simplified, the interface still can't be switched, and the options that are simplified may be altered when updating the best known configuration (BKC).

SUMMARY

According to one or more embodiment of this disclosure, a method for switching basic input/output system (BIOS) interface, adapted to a basic input/output system (BIOS) having a complex module and a simplified module and executed by an electronic device, comprising: entering the BIOS and displaying the simplified module on a BIOS interface; by the electronic device, determining whether a hotkey is triggered when the simplified module is displayed; by the electronic device, determining whether the hotkey is a first hotkey corresponding to the complex module when the hotkey is triggered; and hiding the simplified module and displaying the complex module on the BIOS interface when the hotkey is the first hotkey.

According to one or more embodiment of this disclosure, a method for switching basic input/output system (BIOS) interface, adapted to a basic input/output system (BIOS) having a complex mode and a simplified mode and executed by an electronic device, comprising: entering a BIOS and executing the BIOS interface under the simplified mode, wherein the BIOS interface comprises a displayed first option and a hidden second option under the simplified mode; by the electronic device, determining whether a hotkey is triggered under the simplified mode; by the electronic device, determining whether the hotkey is a first hotkey corresponding to the complex mode when the hotkey is triggered; and executing the BIOS interface under the complex mode to display the first option and the second option when the hotkey is the first hotkey.

The above description and the below embodiments are used to demonstrate and explain the principles of present disclosure, and to provide a further explanation of the claims of present invention.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
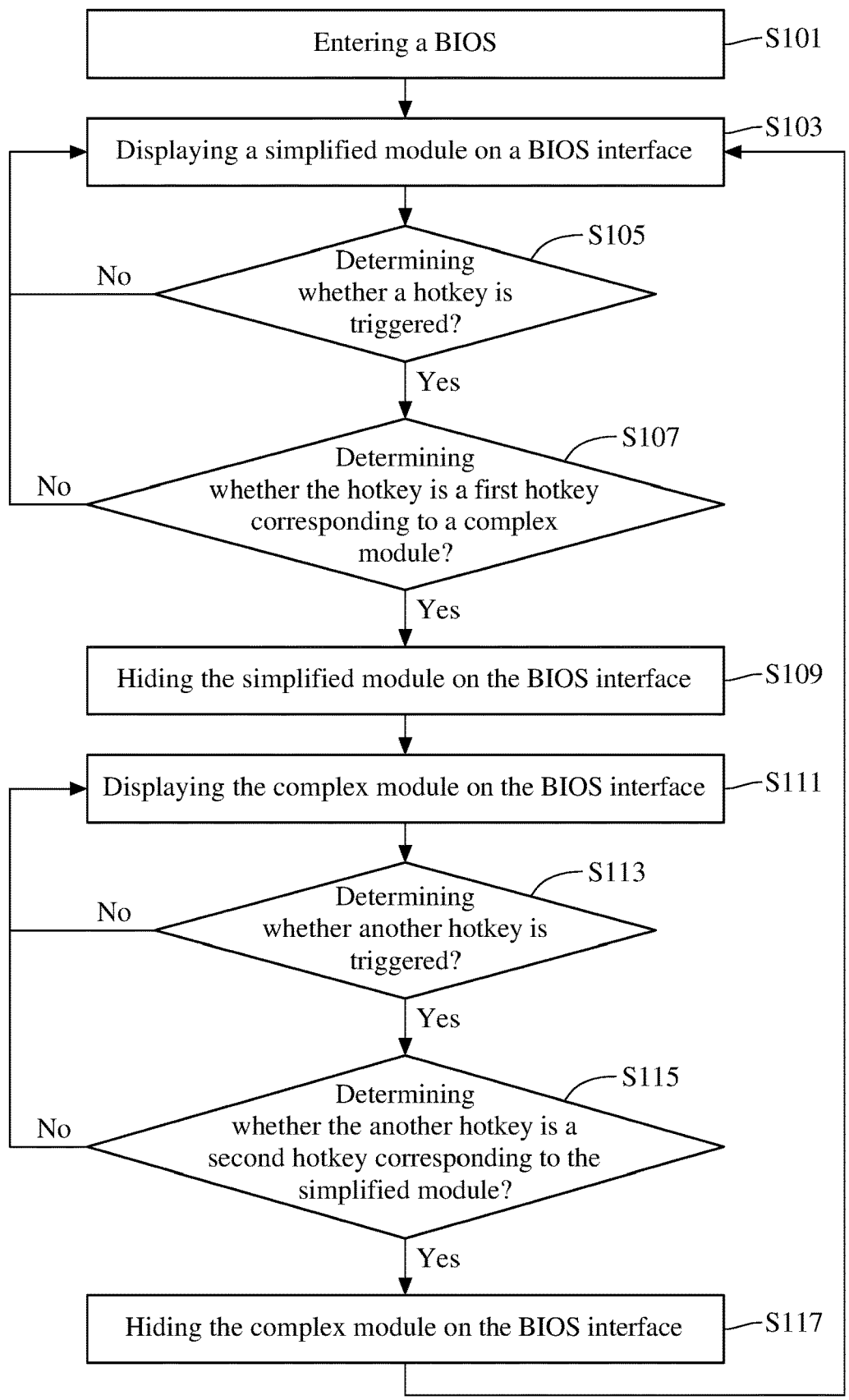
FIG. 1 is a flow chart of a method of switching a basic input/output system (BIOS) interface according to one embodiment of the present disclosure.

Please refer to FIG. 1. FIG. 1 is a flow chart of a method of switching a basic input/output system (BIOS) interface according to one embodiment of the present disclosure. The method is adapted to a basic input/output system (BIOS) having a complex module and a simplified module by an electronic device, wherein the complex module, for example, is a BIOS interface displaying all setup options, or a BIOS subinterface displaying partial setup options. And the simplified module is, for example, a BIOS subinterface displaying less setup options comparing to the complex module. Wherein the electronic device described may be a computer, however, the electronic device may also be other device loaded with read only memory (ROM), operating system or other firmware incorporating BIOS, the present invention is not limited thereto.

In addition, the first hotkey and the second hotkey disclosed below are different from each other. The first hotkey is a hotkey used for driving the complex module, and the second hotkey is a hotkey used for driving the simplified module, wherein the simplified module is a default module in the present embodiment. The hotkey disclosed in the following embodiments may be a key input of a computer keyboard, or a combination of a plurality of keys input, the present invention is not limited thereto.

Please continue referring to FIG. 1, after the BIOS is activated, the BIOS will be entered in step S101, and the electronic device performs step S103 to display the simplified module on the BIOS interface. The electronic device then determines in step S105 whether a hotkey is triggered. If the electronic device determines the hotkey is triggered in step S105, the electronic device then determines whether the hotkey is a first hotkey corresponding to the complex module in step S107. If the electronic device determines the hotkey is the first hotkey corresponding to the complex module, then performs step S109 to hide the simplified module on the BIOS interface, and performs step S111 to display the complex module on the BIOS interface. Wherein, the described step S109 is performed before step S111, however, step S109 may also be performed simultaneously with step S111, or after step S111.

On the contrary, if the electronic device determines in step S105 that the hotkey is not triggered, the electronic device performs step S103 to continuously display the simplified module on the BIOS interface (meaning, the BIOS interface won't be altered). If the electronic device determines the hotkey is triggered, and the electronic device determines in step S107 that the hotkey is not the first hotkey, or the electronic device determines the hotkey is the second hotkey corresponding to the simplified module, the electronic device also performs step S103 to continuously display the simplified module on the BIOS interface. In other words, if the electronic device determines in step S105 that the hotkey is not triggered, determines in step S107 that the hotkey is not the first hotkey, or determines the hotkey is the second hotkey corresponding to the simplified module, the BIOS interface will continuously display the simplified module. Wherein, the second hotkey is different from the first hotkey.

Please continue referring to FIG. 1, after entering the BIOS and displaying the simplified module on the BIOS interface, the hotkey triggered can only be accepted once, and the electronic device makes determination on the inputted hotkey (that is, the electronic device can perform steps S101 to S111 in the embodiment of FIG. 1).

Please continue referring to FIG. 1, when the electronic device performs step S111 to hide the simplified module and display the complex module on the BIOS interface, the electronic device then in step S113 determines whether another hotkey is triggered, wherein the another hotkey described here is different from the hotkey described in step S105. When the electronic device determines the another hotkey is triggered, the electronic device further performs step S115 to determine whether the another hotkey is the second hotkey corresponding to the simplified module. If the electronic device determines the another hotkey is the second hotkey corresponding to the simplified module, then performs step S117 to hide the complex module and on the BIOS interface and performs step S103 to display the simplified module. Wherein, it is disclosed in FIG. 1 that step S103 is performed after step 117 is performed. However, step S117 may also be performed simultaneously with step S103, or performed after step S103.

Please continue referring to FIG. 1, if the electronic device determines in step S113 that the another hotkey is not triggered, then performs step S111, which is to continuously display the complex module on the BIOS interface. If the electronic device determines in step S113 that the another hotkey is triggered, but determines in step S115 that the another hotkey isn't the second hotkey, or the electronic device determines the another hotkey is the first hotkey corresponding to the complex module, then the electronic device also performs step S111 to continuously display the complex module on BIOS interface. In other words, if the electronic device determines in step S113 that the another hotkey is not triggered, determines in step S115 that the another hotkey is not the first hotkey, or determines the another hotkey is the first hotkey corresponding to the complex module, the BIOS interface continuously display the complex module.

Figure 2A:
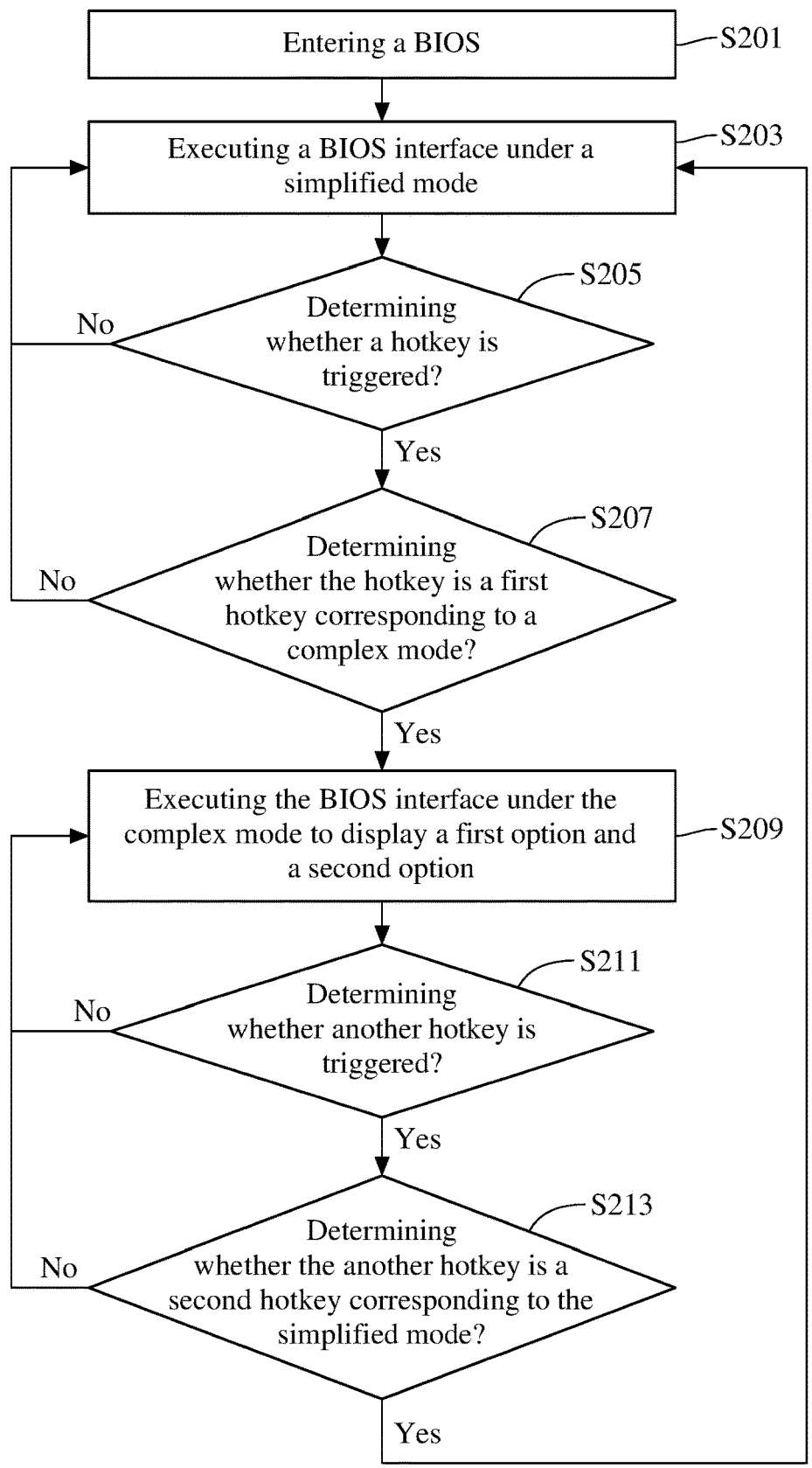
FIG. 2A is a flow chart of a method of switching a BIOS interface according to another embodiment of the present disclosure.

Please refer to FIG. 2A, FIG. 2A is a flow chart of a method of switching a BIOS interface according to another embodiment of the present disclosure. The method is adapted to be executed on a basic input/output system (BIOS) interface having a complex mode and a simplified mode of an electronic device, wherein the BIOS interface under the simplified mode includes a displayed first option and a hidden second option, and under the complex mode includes the displayed first option and the second option. And the first option, for example, is a setup option displayed on the BIOS interface, the second option is a setup option different from the first option. Wherein the electronic device described herein may be realized by the same electronic device as the above embodiment.

Please refer to FIG. 1 and FIG. 2A, the difference between the embodiment of FIG. 1 and the embodiment of FIG. 2A is that, the simplified module and the complex module in the embodiment of FIG. 1 are executed on different BIOS subinterfaces, and by determining the triggered hotkey to display or hide the simplified module and the complex module; the simplified mode and the complex mode in the embodiment of FIG. 2A are executed under the same BIOS interface, and by determining the triggered hotkey to display or hide the setup options (that is, the first option and the second option disclosed in the embodiment of FIG. 2A).

Please continue referring to FIG. 2A, after the BIOS is activated, the BIOS will be entered in step S201, and the electronic device performs step S203 to execute the BIOS interface under the simplified mode (display the first option and hide the second option). The electronic device then determines in step S205 whether a hotkey is triggered, wherein the hotkey may be a key input of a computer keyboard, or a combination of a plurality of keys input, the present invention is not limited thereto. If the electronic device determines in step S205 that the hotkey is triggered, the electronic device then continues to step S207 to determine whether the hotkey is the first hotkey corresponding to the complex mode. If the electronic device determines the hotkey is the first hotkey corresponding to the complex mode, then the electronic device executes the BIOS interface under the complex mode in step S209 to display the first option and the second option.

On the contrary, if the electronic device determines in step S205 that the hotkey is not triggered, the electronic device then performs step S203 to continuously execute the BIOS interface under the simplified mode. If the electronic device determines the hotkey is triggered, and the electronic device determines in step S207 that the hotkey is not the first hotkey, or the electronic device determines the hotkey is the second hotkey corresponding to the simplified mode, the electronic device also performs step S203 to continuously execute the BIOS interface under the simplified mode, and display the first option and the second option. In other words, if the electronic device determines in step S205 that the hotkey is not triggered, the electronic device determines in step S207 that the hotkey is not the first hotkey, or determines the hotkey is the second hotkey corresponding to the simplified mode, the electronic device continuously executes the BIOS interface under the simplified mode to continuously display the first option and hide the second option. Wherein, the second hotkey is different from the first hotkey.

Please continue referring to FIG. 2A, after entering the BIOS and executing the BIOS interface under the simplified mode, the hotkey triggered can only be accepted once, and the electronic device makes determination on the inputted hotkey (that is, the electronic device can perform steps S201 to S209 in the embodiment of FIG. 2A).

Please continue referring to FIG. 2A, after the electronic device executes the BIOS interface under the complex mode to display the first option and the second option in step S209, the electronic device then in step S211 determines whether another hotkey is triggered, wherein the another hotkey described here is different from the hotkey described in step S205. When the electronic device determines the another hotkey is triggered, the electronic device then further determines in step S213 whether the another hotkey is the second hotkey corresponding to the simplified mode. If the electronic device determines the another hotkey is the second hotkey corresponding to the simplified mode, then the electronic device executes the BIOS interface under the simplified mode to display the first option and hide the second option in step S203.

Please continue referring to FIG. 2A, if the electronic device determines in step S211 that the another hotkey is not triggered, then performs step S209, which is to continuously execute the BIOS interface under the complex mode. If the electronic device determines in step S211 that the another hotkey is triggered, but determines in step S213 that the another hotkey is not the second hotkey, or the electronic device determines the another hotkey is the first hokey corresponding to the complex mode, then the electronic device also performs step S209 and continuously executes the BIOS interface under the complex mode to display the first option and the second option. In other words, if the electronic device determines in step S211 that the another hotkey is not triggered, determines in step S213 that the another hotkey is not the first hotkey, or determines the another hotkey is the first hotkey corresponding to the complex mode, the electronic device continuously executes the BIOS interface under the complex mode to display the first option and the second option.

Figure 2B:
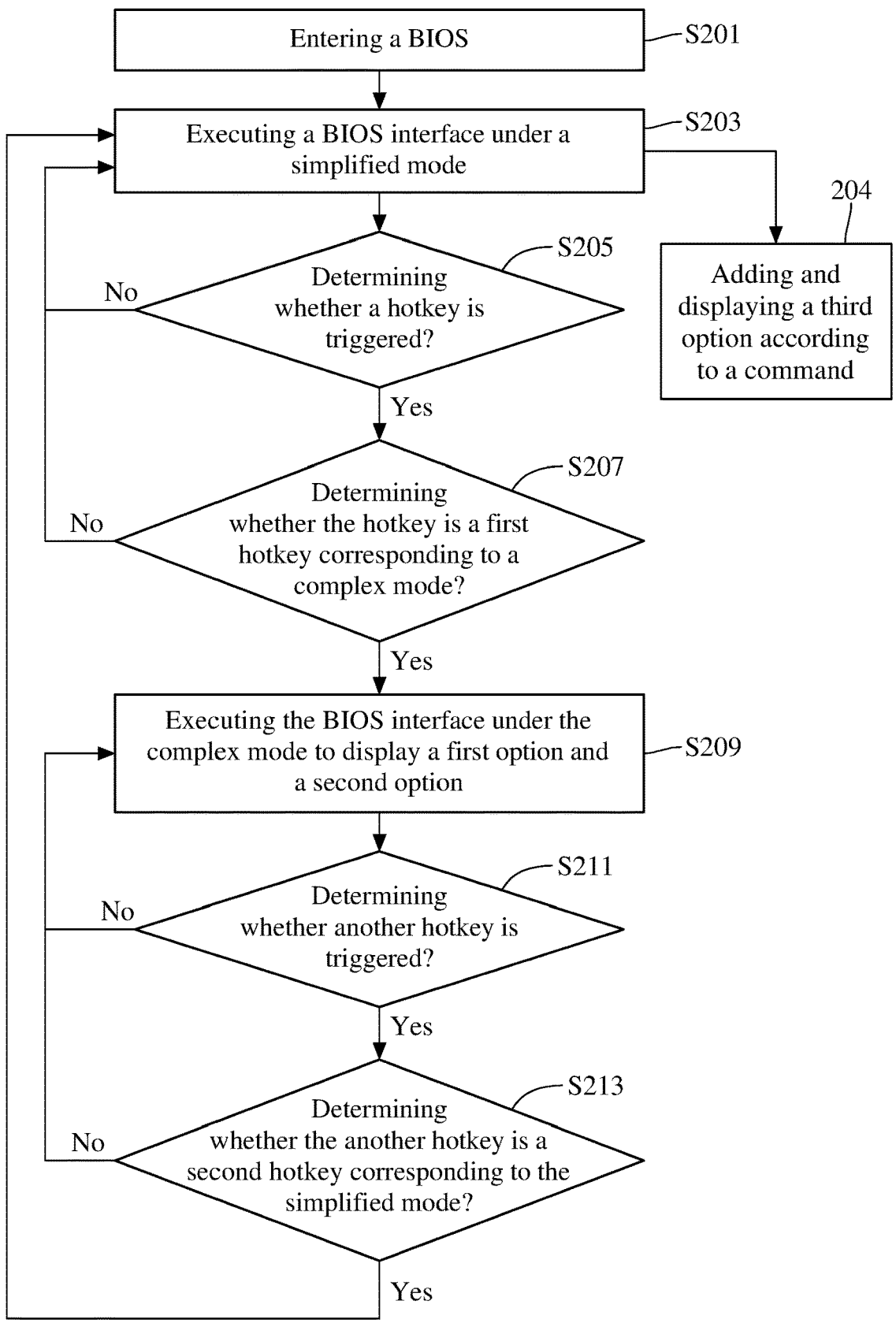
FIG. 2B is a flow chart of a method of switching a BIOS interface according to another embodiment of the present disclosure.

Please refer to FIG. 2B, FIG. 2B is a flow chart of a method of switching a BIOS interface according to another embodiment of the present disclosure. Wherein, the flow chart in FIG. 2B is similar to the flow chart in FIG. 2A, except that FIG. 2B further performs step S204 after step S203. To be more specific, after the electronic device executes the BIOS interface under the simplified mode in step S203, the electronic device may further perform step S204 to add and display a third option according to a command, and the third option is different from the first option and the second option described above. However, step S204 may also be conditionally performed when the BIOS interface is executed under the complex mode. For example, if the BIOS interface is executed under the complex mode, and the complex mode does not include all the options displayed on the BIOS interface when the BIOS is initialized (for instance, the complex mode displays the first option and the second option, and all the options displayed on the BIOS interface during initialization are the first option, the second option and the third option), then the electronic device can also add and display the third option under the complex mode according to the command when the electronic device executes the BIOS interface under the complex mode.

In view of the above description, the method for switching basic input/output system (BIOS) interface provided by one or more embodiments of the present invention, may switch between the simplified mode or the complex mode on the BIOS interface, or execute the simplified mode or the complex mode under the BIOS interface to hide or display options, by means of a hotkey, after the BIOS is activated. Through the method of switching BIOS interface described above, the BIOS interface may be simplified in the early stage of development to shorten the time spent on writing specification, and to not alter the simplified setup options in the late stage of BIOS development when updating the best known configuration. Besides. Besides, through switching the BIOS interface by a hotkey may avoid the user mistakenly changing the options and causing malfunction in a machine, and may further simplify the porting of codes.

In addition, the method for switching basic input/output system (BIOS) interface provided by one or more embodiments of the present invention may add and display another option under the simplified mode after the BIOS is activated and executing the simplified mode, or conditionally add and display another option after executing the complex mode.

The present disclosure has been disclosed above in the embodiments described above, however it is not intended to limit the present disclosure. It is within the scope of the present disclosure to be modified without deviating from the essence and scope of it. It is intended that the scope of the present disclosure is defined by the following claims and their equivalents.

What is claimed is:

1. A method for switching basic input/output system (BIOS) interface, adapted to a basic input/output system (BIOS) having a complex module and a simplified module and executed by an electronic device, comprising:
    entering the BIOS and displaying the simplified module on a BIOS interface;
    by the electronic device, determining whether a hotkey is triggered when the simplified module is displayed;
    by the electronic device, determining whether the hotkey is a first hotkey corresponding to the complex module when the hotkey is triggered; and
    hiding the simplified module and displaying the complex module on the BIOS interface when the hotkey is the first hotkey.

2. The method of claim 1, wherein after hiding the simplified module and displaying the complex module, the method further comprising:
    by the electronic device, determining whether another hotkey is triggered;
    by the electronic device, determining whether the another hotkey is a second hotkey corresponding to the simplified module when the another hotkey is triggered; and
    hiding the complex module and displaying the simplified module on the BIOS interface when the another hotkey is the second hotkey.

3. The method of claim 2, after determining the another hotkey is triggered, the method further comprising: by the electronic device, determining whether the another hotkey is the first hotkey, and continuously displaying the complex module on the BIOS interface when the another hotkey is the first hotkey.

4. The method of claim 1, after determining the hotkey is triggered, the method further comprising: by the electronic device, determining whether the hotkey is a second hotkey corresponding to the simplified module, and continuously displaying the simplified module on the BIOS interface when the hotkey is the second hotkey.

5. A method for switching basic input/output system (BIOS) interface, adapted to a basic input/output system (BIOS) having a complex mode and a simplified mode and executed by an electronic device, comprising:

entering the BIOS and executing a BIOS interface under the simplified mode, wherein the BIOS interface comprises a displayed first option and a hidden second option under the simplified mode;

by the electronic device, determining whether a hotkey is triggered under the simplified mode;

by the electronic device, determining whether the hotkey is a first hotkey corresponding to the complex mode when the hotkey is triggered; and executing the BIOS interface under the complex mode to display the first option and the second option when the hotkey is the first hotkey.

6. The method of claim 5, wherein after displaying the first option and the second option, the method further comprising:

by the electronic device, determining whether another hotkey is triggered;

by the electronic device, determining whether the another hotkey is a second hotkey corresponding to the simplified mode when the another hotkey is triggered; and executing the BIOS interface under the simplified mode to display the first option and hide the second option when the another hotkey is the second hotkey.

7. The method of claim 6, wherein after the another hotkey is triggered, the method further comprising: by the electronic device, determining whether the another hotkey is the first hotkey, maintaining the BIOS interface under the complex mode and continuously displaying the first option and the second option when the another hotkey is the first hotkey.

8. The method of claim 5, wherein after the hotkey is triggered, the method further comprising: by the electronic device, determining whether the hotkey is a second hotkey corresponding to the simplified mode, and continuously executing the BIOS interface under the simplified mode and displaying the first option and hiding the second option when the hotkey is the second hotkey.

9. The method of claim 5, wherein after entering the BIOS and executing the BIOS interface under the simplified mode, the method further comprising adding and displaying a third option under the simplified mode according to a command.

* * * * *